United States Patent
Kim

(10) Patent No.: US 10,368,311 B2
(45) Date of Patent: Jul. 30, 2019

(54) COMMUNICATION METHOD FOR DETERMINING CHANNEL ACCORDING TO CURRENT CONSUMPTION AND ELECTRONIC DEVICE FOR SUPPORTING THE SAME

(71) Applicant: Samsung Electronics Co., Ltd., Suwon-si, Gyeonggi-do (KR)

(72) Inventor: Dong Ha Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 14/923,829

(22) Filed: Oct. 27, 2015

(65) Prior Publication Data

US 2016/0119877 A1    Apr. 28, 2016

(30) Foreign Application Priority Data

Oct. 28, 2014 (KR) .................. 10-2014-0147595

(51) Int. Cl.
*H04W 52/02* (2009.01)
*H04W 52/34* (2009.01)

(52) U.S. Cl.
CPC ..... *H04W 52/0251* (2013.01); *H04W 52/028* (2013.01); *H04W 52/0245* (2013.01); *H04W 52/34* (2013.01); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01);
(Continued)

(58) Field of Classification Search
CPC ............. H04W 52/0251; H04W 52/34; H04W 52/0245; H04W 52/028; Y02D 70/166; Y02D 70/1222; Y02D 70/164; Y02D 70/144; Y02D 70/00; Y02D 70/26; Y02D 70/1264; Y02D 70/168; Y02D 70/142; Y02D 70/1242; Y02D 70/1262
See application file for complete search history.

(56) References Cited

U.S. PATENT DOCUMENTS 8,705,461 B2   4/2014   Bala et al.
9,094,957 B2   7/2015   Bala et al.
(Continued)

FOREIGN PATENT DOCUMENTS

WO    2010/048178 A1   4/2010
WO    2011121578 A2   10/2011

OTHER PUBLICATIONS

1. Liu Fei et al: "Design and Performance Analysis of an Energy-Efficient Uplink Carrier Aggregation Scheme", IEEE Journal on Selected Areas in Communications, IEEE Service Center, Piscataway, US, vol. 2, No. 2, Feb. 1, 2014 (Feb. 1, 2014), pp. 197-207, XP011537567, ISSN: 0733-8716. DOI: 10.1109/JSAC.2014. 141202 [retrieved on Jan. 17, 2017].

*Primary Examiner* — Chirag G Shah
*Assistant Examiner* — Joshua Smith
(74) *Attorney, Agent, or Firm* — Jefferson IP Law, LLP

(57) ABSTRACT

A communication method is provided. The communication method includes comparing an amount of current consumed by a first communication module which operates a first channel with an amount of current consumed by a second communication module which operates a second channel and determining at least one of the first channel or the second channel as a primary component carrier (PCC) according to the compared result.

16 Claims, 9 Drawing Sheets

(52) U.S. Cl.
CPC .......... *Y02D 70/144* (2018.01); *Y02D 70/164* (2018.01); *Y02D 70/166* (2018.01); *Y02D 70/168* (2018.01); *Y02D 70/26* (2018.01)

(56) References Cited

U.S. PATENT DOCUMENTS

| | | |
|---|---|---|
| 9,788,311 B2 | 10/2017 | Bala et al. |
| 2006/0276161 A1* | 12/2006 | Twitchell .............. H04W 36/14 455/343.1 |
| 2010/0061284 A1* | 3/2010 | Chen ................ H04W 52/0229 370/311 |
| 2010/0227569 A1 | 9/2010 | Bala et al. |
| 2011/0003611 A1* | 1/2011 | Haas ..................... H04W 52/10 455/512 |
| 2011/0040990 A1* | 2/2011 | Chan ................ H04W 52/0254 713/300 |
| 2011/0216686 A1 | 9/2011 | Wu |
| 2011/0243278 A1 | 10/2011 | Cheng |
| 2011/0244860 A1* | 10/2011 | Wu ................... H04W 74/0833 455/436 |
| 2012/0056786 A1* | 3/2012 | Pandey ............... H04W 52/283 342/463 |
| 2012/0095311 A1* | 4/2012 | Ramey ............. H04W 72/1215 600/365 |
| 2012/0196530 A1* | 8/2012 | Moosavi ........... H04W 52/0251 455/41.1 |
| 2012/0214540 A1 | 8/2012 | Narasimha et al. |
| 2013/0010621 A1* | 1/2013 | Yoshiuchi ............. H04W 40/08 370/252 |
| 2013/0064219 A1* | 3/2013 | Siomina ................ H04W 64/00 370/331 |
| 2013/0104124 A1* | 4/2013 | Tsirkin ................ H04L 49/9036 718/1 |
| 2013/0242789 A1 | 9/2013 | Narasimha et al. |
| 2013/0286952 A1 | 10/2013 | Ghosh et al. |
| 2014/0080506 A1* | 3/2014 | Siomina ................ H04W 64/00 455/456.1 |
| 2014/0092825 A1 | 4/2014 | Bostroem et al. |
| 2014/0106764 A1 | 4/2014 | Huang |
| 2014/0179328 A1 | 6/2014 | Bala et al. |
| 2015/0245250 A1* | 8/2015 | Bhattacharjee ......... H04L 5/001 370/236 |
| 2015/0296492 A1 | 10/2015 | Bala et al. |

* cited by examiner

| TRANSMIT POWER | AMOUNT (MA) OF CURRENT CONSUMED IN B7 BY FIRST COMMUNICATION MODULE | AMOUNT (MA) OF CURRENT CONSUMED IN B5 BY SECOND COMMUNICATION MODULE |
|---|---|---|
| 0 dBM | 219 | 212 |
| 1 dBM | 222 | 214 |
| 2 dBM | 224 | 216 |
| 3 dBM | 226 | 218 |
| 4 dBM | 229 | 220 |
| 5 dBM | 236 | 224 |
| 6 dBM | 239 | 227 |
| 7 dBM | 243 | 231 |
| 8 dBM | 247 | 236 |
| 9 dBM | 253 | 241 |
| 10 dBM | 259 | 247 |
| 11 dBM | 268 | 255 |
| 12 dBM | 275 | 263 |
| 13 dBM | 290 | 281 |
| 14 dBM | 300 | 292 |
| 15 dBM | 320 | 307 |
| 16 dBM | 340 | 320 |
| 17 dBM | 360 | 341 |
| 18 dBM | 390 | 365 |
| 19 dBM | 430 | 415 |
| 20 dBM | 480 | 450 |
| 21 dBM | 530 | 490 |
| 22 dBM | 570 | 527 |
| 23 dBM | 620 | 527 |

FIG. 5

COMMUNICATION METHOD FOR DETERMINING CHANNEL ACCORDING TO CURRENT CONSUMPTION AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Oct. 28, 2014 in the Korean Intellectual Property Office and assigned Serial number 10-2014-0147595, the entire disclosure of which is hereby incorporated by reference.

TECHNICAL FIELD

The present disclosure relates to a communication method performed in an electronic device which supports a carrier aggregation (CA) technology.

BACKGROUND

Electronic devices, such as smartphones and tablet personal computers (PCs), may perform communication with external devices. Electronic devices may communicate a variety of wireless data, such as voice data, image data, and video data, with external devices. Various communication technologies are applied to a communication system to correspond to amounts of increased wireless communication data.

A carrier aggregation (CA) technology among the communication technologies may be a technology of combining a plurality of frequency bands and using the combined frequency band as one frequency band. The CA technology may improve a data communicating speed by efficiently using limited frequency resources. In the above-mentioned CA technology of the related art, a base station determines characteristics or priorities of channels and a mobile terminal may not change the characteristics or priorities of the channels. Therefore, electronic devices according to the related art may lead to losing the amount of power consumed by batteries, or shortening a waiting time or an available time by determining characteristics or priorities of channels without reflecting their characteristics.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a communication method for enhancing power efficiency by determining a characteristic or a priority of a channel according to a standard of an electronic device and the electronic device for supporting the same.

In accordance with an aspect of the present disclosure, a communication method of an electronic device is provided. The communication method includes comparing an amount of current consumed by a first communication module which operates a first channel with an amount of current consumed by a second communication module which operates a second channel and determining at least one of the first channel or the second channel as a primary component carrier (PCC) according to the compared result.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a drawing illustrating a current consumption table according to a change of a transmit power according to various embodiments of the present disclosure;

Throughout the drawings, it should be noted that like reference numbers are used to depict the same or similar elements, features, and structures.

DETAILED DESCRIPTION

Figure 1:
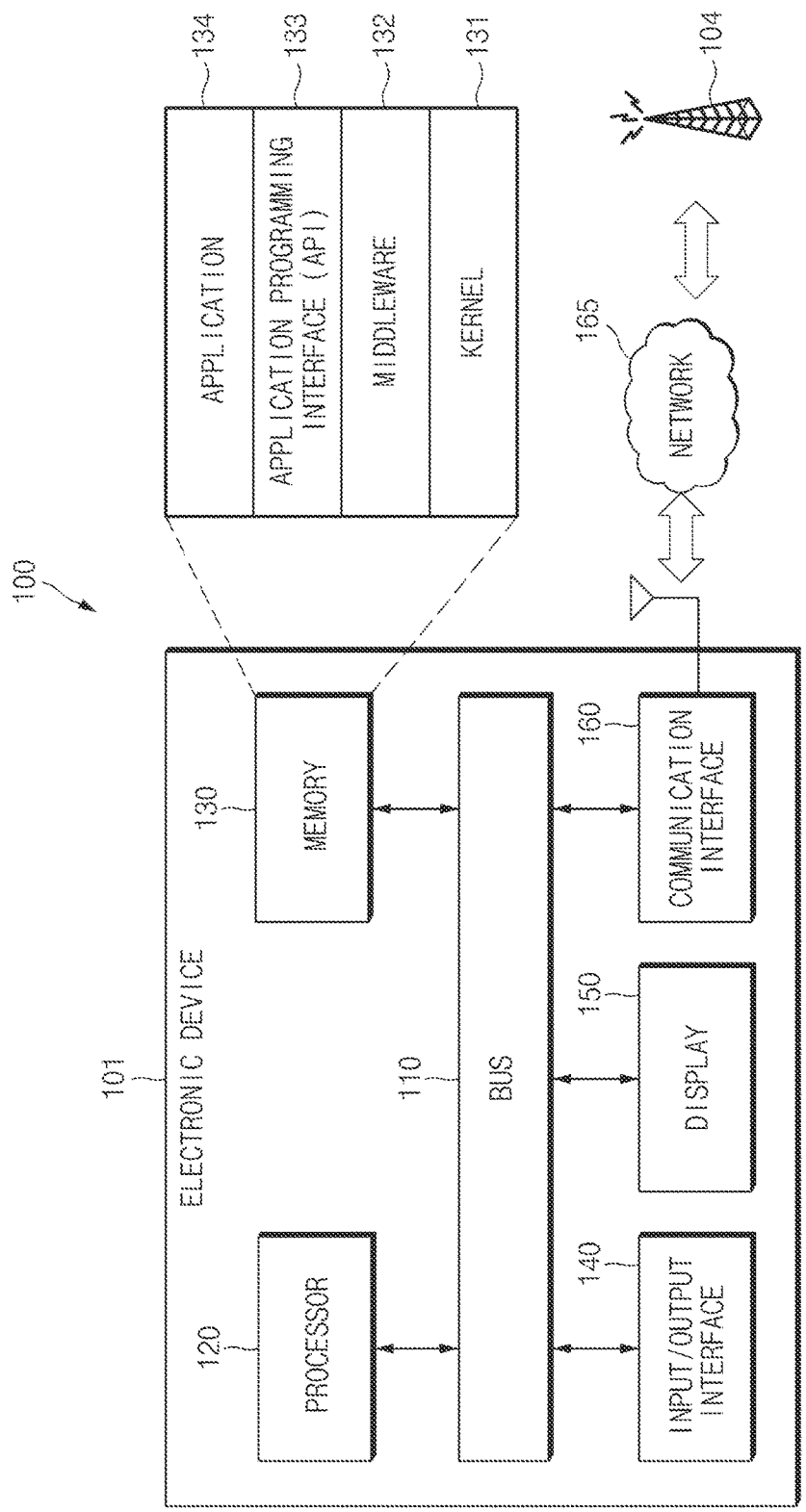
FIG. 1 is a block diagram illustrating a configuration of a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions "include" and "comprise" or "may include" and "may comprise" used herein indicate disclosed corresponding functions, operations, or existence of elements but do not exclude one or more additional functions, operations, or elements. Also, it should be further understood that the terms "include" and "comprise" or "have" used herein specify the presence of disclosed features, integers, operations, elements, components, or combinations thereof but do not preclude the presence or addition of one or more features, integers, operations, elements, components, or combinations thereof.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used herein may refer to various elements of various embodiments of the present disclosure, but do not limit the corresponding elements. For instance, such expressions do not limit the order and/or priority of the corresponding elements. The expressions may be used to distinguish one element from another element. For instance, both "a first user device" and "a second user device" indicate different user devices from each other. For example, a first component may be referred to as a second component and vice versa without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, it should be understood that there are no intervening elements.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure.

Electronic devices according to various embodiments of the present disclosure may include devices, each of which includes a communication function. The electronic devices may include at least one of, for example, smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group phase 1 or phase 2 (MPEG-1 or MPEG-2) audio layer 3 (MP3) players, mobile medical devices, cameras, or wearable devices (e.g., head-mounted-devices (HMDs), such as electronic glasses, an electronic apparel, electronic bracelets, electronic necklaces, electronic appcessories, electronic tattoos, or smart watches).

According to various embodiments of the present disclosure, the electronic devices may be smart home appliances, each of which has a communication function. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, or electronic picture frames.

According to various embodiments of the present disclosure, the electronic devices may include at least one of various medical devices (e.g., a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems for vessels, gyrocompasses, and the like), avionics, security devices, head units for vehicles, industrial or home robots, automatic teller's machines (ATMs), or points of sales (POSs), each of which has a communication function.

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like), each of which has a communication function. The electronic devices according to various embodiments of the present disclosure may be one or more combinations of the above-mentioned devices. The electronic devices according to various embodiments of the present disclosure may be flexible electronic devices. Also, it would be obvious to those skilled in the art that electronic devices according to various embodiments of the present disclosure are not limited to the above-mentioned devices.

Hereinafter, a description will be given of a communication channel operating technology according to various embodiments of the present disclosure with reference to the accompanying drawings. The term "user" used herein according to various embodiments of the present disclosure may refer to a person who uses an electronic device or may refer to a device (e.g., an artificial electronic device) which uses an electronic device.

FIG. 1 is a block diagram illustrating a configuration of a network environment 100 including an electronic device 101 according to various embodiments of the present disclosure.

Referring to FIG. 1, the electronic device 101 may include a bus 110, a processor 120, a memory 130, an input and output interface 140, a display 150, and a communication interface 160. In various embodiments of the present disclosure, the electronic device 101 may perform communication by a carrier aggregation (CA) technology with an external device (e.g., a base station 104) through the communication interface 160.

The CA technology may be a technology of combining a plurality of frequency bands and using the combined frequency band as one frequency band. For example, the CA technology may include a long term evolution-advanced (LTE-A) service, a broadband LTE-A service, and the like. The electronic device 101 may determine a characteristic or an active level of a communication channel by reflecting various conditions (e.g., current consumption, power consumption, a transmit power, or receive sensitivity of a channel, and the like) in the electronic device 101. Additional information about the CA technology may be provided with reference to FIGS. 2 to 9.

The bus 110 may include a circuit which connects the above-mentioned components with each other and transmits communication (e.g., a control message) between the above-mentioned components. In various embodiments of the present disclosure, the bus 110 may provide the information received from the external device (e.g., the base station 104) through the communication interface 160 to the respective components of the electronic device 101. Also, the bus 110 may provide information to be transmitted from the above-mentioned components to the external device (e.g., the base station 104) to the communication interface 160.

The processor 120 may receive an instruction from the above-mentioned other components (e.g., the memory 130, the input and output interface 140, the display 150, or the communication interface 160, and the like) through the bus 110, may decode the received instruction, and may perform calculation or data processing according to the decoded instruction. In various embodiments of the present disclosure, the processor 120 may provide a signal for controlling at least communication module included in the communication interface 160. Also, the processor 120 may perform calculation necessary for a process of selecting one of the at least one communication module according to current consumption.

The memory 130 may store instructions or data which are received from the processor 120 or other components (e.g., the input and output interface 140, the display 150, or the communication interface 160, and the like) or are generated by the processor 120 or the other components. In various embodiments of the present disclosure, the memory 130 may store information about an operation condition (e.g., a given power, current consumption, and the like) of a communication module included in the communication interface 160.

The memory 130 may include programming modules, such as a kernel 131, a middleware 132, an application programming interface (API) 133, or an application. The above-mentioned programming modules may be configured with software, firmware, hardware, or at least two or more combinations thereof.

The kernel 131 may control or manage system resources (e.g., the bus 110, the processor 120, or the memory 130, and the like) used to execute an operation or function implemented in the other programming modules (e.g., the middleware 132, the API 133, or the application 134). Also, the kernel 131 may provide an interface which may control or manage system resources by accessing a separate component of the electronic device 101 in the middleware 132, the API 133, or the application 134.

The middleware 132 may play a role as, for example, a go-between such that the API 133 or the application 134 communicates with the kernel 131 and transmits and receives data. Also, the middleware 132 may perform, for example, control (e.g., scheduling or load balancing) for work requests using a method of assigning a priority, which may use system resources (e.g., the bus 110, the processor 120, or the memory 130, and the like) of the electronic device 101, to at least one application of the application 134, in connection with the work requests received from the application 134.

The API 133 may be an interface in which the application 134 controls a function provided from the kernel 131 or the middleware 132. For example, the API 133 may include, for example, at least one interface or function (e.g., instruction) for file control, window control, image processing, or text control, and the like.

According to various embodiments of the present disclosure, the applications 134 may include a short message service (SMS)/multimedia message service (MMS) application, an e-mail application, a calendar application, an alarm application, a health care application (e.g., an application for measuring quantity of exercise or blood sugar, and the like), or an environment information application (e.g., an application for providing atmospheric pressure information, humidity information, or temperature information, and the like), and the like. Additionally or alternatively, the application 134 may be an application associated with exchanging information between the electronic device 101 and the external device (e.g., the base station 104). The application associated with exchanging the information may include, for example, a notification relay application for transmitting specific information to the external device or a device management application for managing the external device.

The input and output interface 140 may transmit instructions or data input from a user through an input and output device (e.g., a sensor, a keyboard, or a touch screen) to, for example, the processor 120, the memory 130, the display 150, or the communication interface 160 through the bus 110. For example, the input and output interface 140 may provide data about a touch of the user, which is input through the touch screen, to the processor 120. Also, the input and output interface 140 may output instructions or data received from, for example, the processor 120, the memory 130, or the communication interface 160 through the bus 110, through the input and output device (e.g., a speaker or the display 150). For example, the input and output interface 140 may output voice data processed through the processor 120 to the user through the speaker. In various embodiments of the present disclosure, the input and output interface 140 may collect data from the external device (e.g., the base station 104) through the communication interface 160.

The display 150 may display a variety of information (e.g., multimedia data, or text data, and the like) to the user. In various embodiments of the present disclosure, the display 150 may display information received through the communication interface 160.

The communication interface 160 may perform communication between the electronic device 101 and the external devices (e.g., the base station 104). For example, the communication interface 160 may connect to a network 165 through wireless communication or wired communication and may communicate with the external device. The wireless communication may include at least one of, for example, Wi-Fi communication, Bluetooth (BT) communication, near field communication (NFC), GPS communication, or cellular communication (e.g., LTE, LTE-A, code division multiple access (CDMA), wideband CDMA (WCDMA), universal mobile telecommunications system (UMTS), wireless broadband (WiBro), or global system for mobile communications (GSM), and the like). The wired communication may include at least one of, for example, a universal serial bus (USB), a high definition multimedia interface (HDMI), a recommended standard 232 (RS-232), or a plain old telephone service (POTS).

According to various embodiments of the present disclosure, the communication interface 160 may perform communication (e.g., LTE-A communication and broadband LTE-A communication) by a CA technology. The CA technology may be a technology of combining a plurality of frequency bands and using the combined frequency band as one logic frequency band in a wireless communication system. The CA technology may improve a data communicating speed by efficiently using limited frequency resources. Each frequency band which is a CA target may be called a component carrier (CC). Each CC may be defined as a bandwidth and a center frequency. For example, the electronic device 101 may combine 5 CCs, each of which has a bandwidth of 20 MHz, and may perform communication using a frequency band having a bandwidth of 100 MHz.

Each combined CC may be classified as a primary component carrier (PCC) or a secondary component carrier (SCC). The PCC may be a channel which first performs communication prior to the SCC. For example, if combining 5 CCs, each of has a bandwidth of 20 MHz, performing communication, one CC may be determined as a PCC and the other 4 CCs may be determined as SCCs.

According to various embodiments of the present disclosure, the communication interface 160 may include at least one communication module which may operate each combined CC. The communication module may communicate a signal included in a predetermined CC with the external device (e.g., the base station 104). The communication module may be controlled according to various conditions (e.g., current consumption, power consumption, a transmit power, receive sensitivity of a channel, and the like) associated with the electronic device 101 or settings of the external device (e.g., the base station 104) (e.g., reception of setting information through a system information bit (SIB). Additional information about the communication interface 160 may be provided with reference to FIGS. 2 to 9.

According to various embodiments of the present disclosure, the network 165 may be telecommunications network. The telecommunications network may include at least one of a computer network, the Internet, an internet of things, or a telephone network. According to an embodiment of the present disclosure, a protocol (e.g., a transport layer protocol, a data link layer protocol, or a physical layer protocol) for communication between the electronic device 101 and the external device may be supported in at least one of the application 134, the API 133, the middleware 132, the kernel 131, or the communication interface 160.

Figure 2:
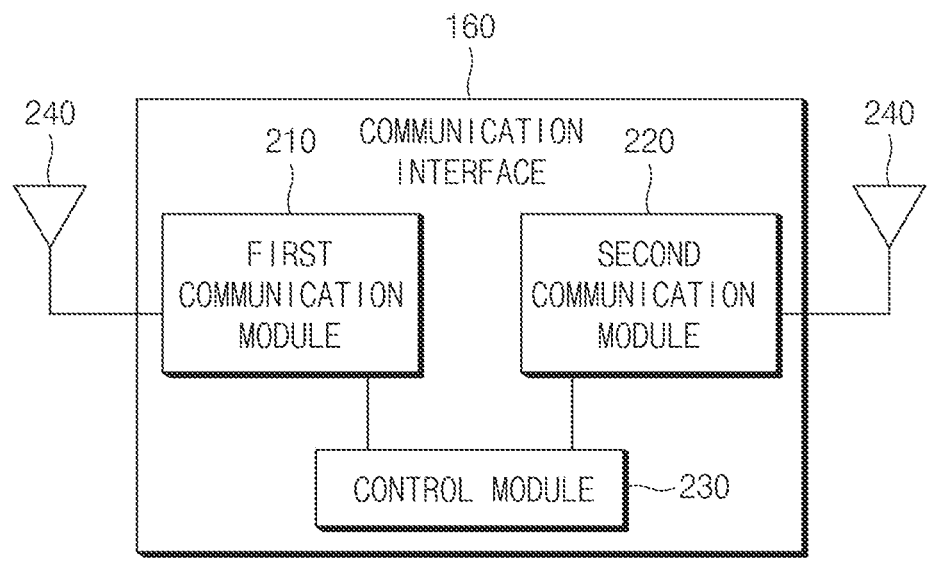
FIG. 2 is a block diagram illustrating a detailed configuration of a communication interface according to various embodiments of the present disclosure.

FIG. 2 is a block diagram illustrating a detailed configuration of a communication interface according to various embodiments of the present disclosure.

Referring to FIG. 2, a communication interface 160 may include a first communication module 210, a second communication module 220, a control module 230, and an antenna 240. FIG. 2 illustrates an example in which the communication interface 160 includes the two communication modules. The scope and spirit of the present disclosure may not be limited thereto. For example, the communication interface 160 may be implemented to include 3 or more communication modules.

The first communication module 210 and the second communication module 220 may be hardwarily separated or may be one communication module which softwarily operates by one program. Each of the first communication module 210 and the second communication module 220 may hardwarily include a transmit module, a receive module, a power providing module, and the like. The first communication module 210 and the second communication module 220 may perform a communication function according to a condition preset by one software.

Each of the first communication module 210 and the second communication module 220 may include a transmit module and a receive module. Each of the first communication module 210 and the second communication module 220 may communicate a signal included in at least one of a plurality of frequency bands. If an electronic device 101 of FIG. 1 communicates signals included in a band B1 (e.g., 2100 MHz), a band B3 (e.g., 1800 MHz), a band B5 (e.g., 850 MHz), and a band B7 (e.g., 2600 MHz), the first communication module 210 may communicate signals included in the bands B3 and B7 with an external device (e.g., a base station 104 of FIG. 1) and the second communication module 220 may communicate signals included in the bands B1 and B5 with the external device (e.g., the base station 104).

Hereinafter, a description will be given about, but is not limited to, a first channel (e.g., the band B7) operated by the first communication module 210 and a second channel (e.g., the band B5) operated by the second communication module 220.

According to various embodiments of the present disclosure, at least one of the first channel and the second channel may operate as a PCC and a channel except for the PCC may operate as an SCC. In various embodiments of the present disclosure, a channel set to the PCC may be activated always in a communication state, and a channel set to the SCC may be selectively activated according to a predetermined condition. The PCC may be a channel which first performs communication prior to the SCC.

According to various embodiments of the present disclosure, the channel set to the PCC may be a channel which is responsible for an uplink (e.g., data upload) as well as a downlink (e.g., data download). In contrast, the channel set to the SCC may be responsible for a downlink (e.g., data download). The channel set to the PCC may be responsible for an uplink (e.g., data upload) in a limited way or may not be responsible for the uplink (e.g., data upload).

The PCC or the SCC may be initially set through the external device (e.g., the base station 104). The external device (e.g., the base station 104) may provide information of determining one of a first channel and a second channel as a PCC to the electronic device 101. For example, the base station 104 may determine a PCC or an SCC according to a test data communicating speed and may provide setting information through an SIB. The control module 230 may determine a PCC or an SCC according to the setting information provided from the external device (e.g., the base station 104).

According to various embodiments of the present disclosure, after the PCC or the SCC is initially set through the external device (e.g., the base station 104), the control module 230 may change a PCC in consideration of various situation changes (e.g., amounts of current consumed by the first and second communication modules 210 and 220, the remaining capacity of a battery, and the like) associated with the electronic device 101. The control module 230 may change a PCC and an SCC by reflecting power efficiency of each of the first and second communication modules 210 and 220.

The control module 230 may provide a control signal for operations of the first communication module 210 and the second communication module 220. The control module 230 may provide a signal received through the first communication module 210 and the second communication module 220 to each component (e.g., a processor 120 of FIG. 1 and the like) of the electronic device 101. The control module 230 may provide a signal to be transmitted to the external device (e.g., the base station 104) through the first communication module 210 and the second communication module 220. In various embodiments of the present disclosure, the control module 230 may supply power for operations of the first communication module 210 and the second communication module 220. In various embodiments of the present disclosure, the control module 230 may be included in the processor 120 of FIG. 1.

According to various embodiments of the present disclosure, the control module 230 may perform a switching function to select one of the first communication module 210 and the second communication module 220 and transmit data to the external device (e.g., the base station 104) through the selected communication module. For example, the control module 230 may select a communication module, which consumes some current, according to amounts of current consumed per unit time by the first and second communication modules 210 and 220 and may transmit data to the external device through the selected communication module. Information about the control module 230 may be provided with reference to FIGS. 3 to 7.

The antenna 240 may communicate data with the external device (e.g., the base station 104). FIG. 2 illustrates an example in which the first communication module 210 and the second communication module 220 communicate data through a separate antenna, respectively. The scope and spirit of the present disclosure may not be limited thereto. In various embodiments of the present disclosure, the first communication module 210 and the second communication module 220 may transmit and receive data through one integrated antenna.

According to various embodiments of the present disclosure, the electronic device may include a first communication module configured to perform communication through a channel and to operate a first channel, a second communication module configured to operation a second channel, and a control module configured to compare an amount of current consumed by the first communication module with an amount of current consumed by the second communication module. The control module may determine at least one of the first channel or the second channel as a PCC according to the compared result.

According to various embodiments of the present disclosure, the control module may compare an amount of current consumed per unit time by the first communication module according to a transmit power of the first communication module with an amount of current consumed per unit time by the second communication module according to a transmit power of the second communication module. The transmit power may be preset in connection with receive sensitivity of each of the first channel and the second channel.

According to various embodiments of the present disclosure, in a state where the first channel is set to the PCC, if the amount of the current consumed by the first communication module is greater than the amount of the current consumed by the second communication module, the control module may determine the second channel as a new PCC. If a difference between the amount of the current consumed by the first communication module and the amount of the current consumed by the second communication module is within a predetermined current range, the control module may maintain a current PCC.

According to various embodiments of the present disclosure, the control module may compare the amount of the current consumed by the first communication module with the amount of the current consumed by the second communication module according to a table about an amount of current consumed per unit time by the first communication module according to a change of a transmit power of the first communication module and an amount of current consumed per unit time by the second communication module according to a change of a transmit power of the second communication module.

Figure 3:
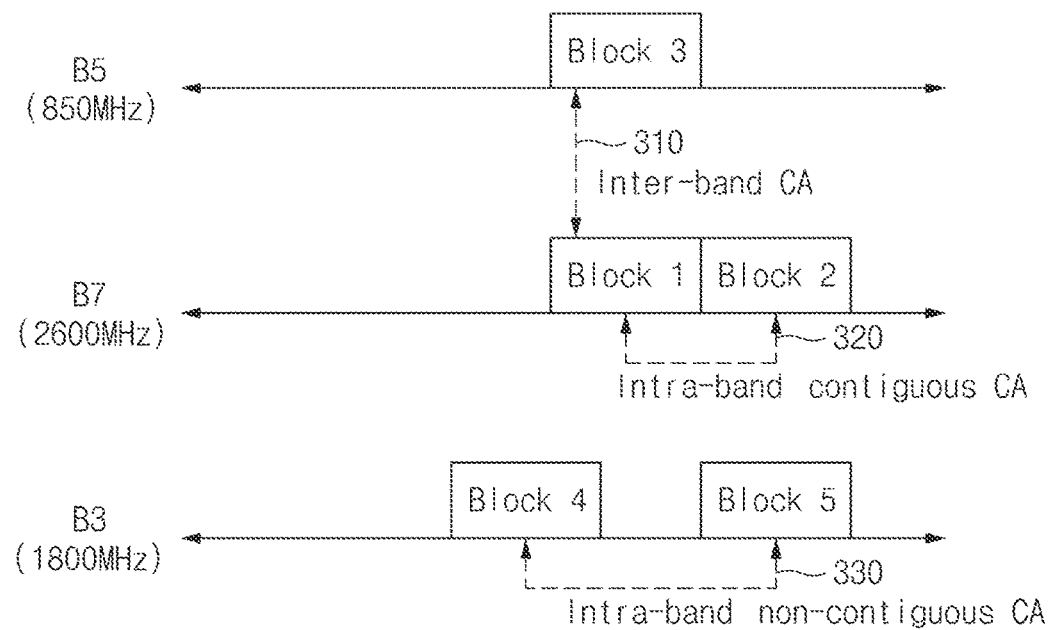
FIG. 3 is a drawing illustrating kinds of carrier aggregation (CA) technologies according to various embodiments of the present disclosure.

FIG. 3 is a drawing illustrating kinds of CA technologies according to various embodiments of the present disclosure.

Referring to FIG. 3, each of the first communication module 210 and the second communication module 220 may include a receive module and a transmit module. Each of the first communication module 210 and the second communication module 220 may communicate a signal included in various frequency bands. In various embodiments of the present disclosure, each of the first communication module 210 and the second communication module 220 may communicate a signal included in some of frequency bands defined on the 3rd generation partnership project (3GPP) international standard. The 3GPP international standard defines a band B1 (2100 MHz), a band B3 (1800 MHz), a band B5 (850 MHz), a band B7 (2600 MHz), and a band B8 (900 MHz). The defined bands may be arranged to service providers every constant block according to a communication policy and the like of each country.

According to various embodiments of the present disclosure, a CA technology may be classified as inter-band CA 310, intra-band contiguous CA 320, or intra-band non-contiguous CA 330.

In FIG. 3, for example, if a service provider 1 is assigned a frequency of contiguous block 1 and block 2 of the band B7 (2600 MHz) and is assigned a frequency of a block 3 of the band B5 (850 MHz) and if the service provider 2 is assigned a frequency of non-contiguous block 4 and block 5 of the band B3 (1800 MHz), each of the service provider 1 and the service provider 2 may combine the assigned frequency blocks and may provide a communication service (e.g., an LTE-A service, a broadband LTE-A service, and the like) by the CA technology.

The inter-band CA 310 may be a technology in which the service provider 1 combines the block 1 of the band 7 (2600 MHz) with the block 3 of the band B5 (850 MHz), which are different from each other, and provides a communication service.

The intra-band contiguous CA 320 may be a technology in which the service provider 1 combines the contiguous block 1 and block 2 in the same band B7 (2600 MHz) and provides a communication service.

The intra-band non-contiguous CA 330 may be a technology in which the service provider 2 combines the non-contiguous block 4 and block 5 in the same band B3 (1800 MHz) and provides a communication service.

According to various embodiments of the present disclosure, an electronic device 101 of FIG. 1 may provide a communication service by the inter-band CA 310. For example, the first communication 210 and the second communication 220 may be set such that the first communication 210 communicates a signal included in the block 1 of the band B7 (2600 MHz) and the second communication 220 communicates a signal included in the block 3 of the band B5 (850 MHz). The control module 230 may determine a PCC or an SCC among the blocks by reflecting various conditions (e.g., current consumption, power consumption, a transmit power, or receive sensitivity of a channel, and the like) of the electronic device 101.

According to various embodiments of the present disclosure, if operating in a way of the intra-band contiguous CA 320 or the intra-band contiguous CA 330, the electronic device 101 may maintain a PCC/SCC state set by a base station 104 of FIG. 1. The electronic device 101 may set a PCC/SCC according to a PCC/SCC setting way of the related art with respect to communication using intra-band CA having a small difference between an amount of current consumed by the first communication module 210 and an amount of current consumed by the second communication module 220. The electronic device 101 may set a PCC/SCC in consideration of its internal conditions with respect to communication using inter-band CA having a big difference between the amount of the current consumed by the first communication module 210 and the amount of the current consumed by the second communication module 220.

Figure 4:
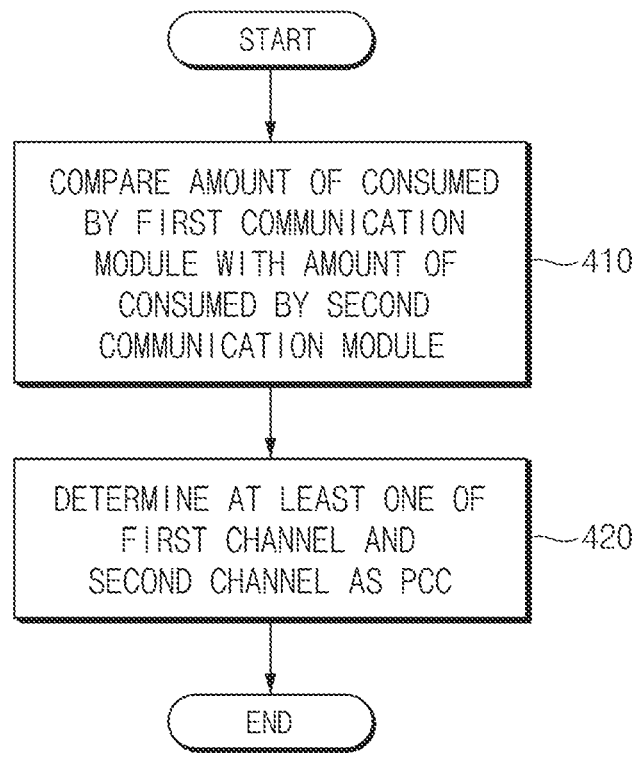
FIG. 4 is a flowchart illustrating an operation of a communication method according to various embodiments of the present disclosure.

FIG. 4 is a flowchart illustrating an operation of a communication method according to various embodiments of the present disclosure.

Referring to FIG. 4, a first communication module 210 and a second communication module 220 of FIG. 2 may operate a first channel and a second channel, respectively. A control module 230 of FIG. 2 may compare an amount of current consumed by the first communication module 210 with an amount of current consumed by the second communication module 220 and may reflect the compared result to determining priorities of the first channel and the second channel.

According to various embodiments of the present disclosure, the control module 230 may compare an amount (hereinafter, current consumption) of current consumed per unit time by the first communication module 210 according to a transmit power of the first communication module 210 with an amount of current consumed per unit time by the second communication module 220 according to a transmit power of the second communication module 220. The transmit power may be power supplied to the first communication 210 or the second communication module 220 by the control module 230 to transmit data to an external device.

In various embodiments of the present disclosure, the transmit power may be changed in connection with receive sensitivity (e.g., a received signal strength indication (RSSI)). For example, if an index about receive sensitivity is high, a transmit power may be decreased. If an index about receive sensitivity is low, a transmit power may be increased. Therefore, the control module 230 may compensate communication quality of a channel using a transmit power.

According to various embodiments of the present disclosure, the control module 230 may compare an amount of current consumed by the first communication module 210 with an amount of current consumed by the second communication module 220 using a table which is previously stored in a manufacturing operation of an electronic device 101 or a communication interface 160 of FIG. 1 or a setting operation about a communication service. Information about a way of using the table may be provided with reference to FIG. 5.

In operation 420, the control module 230 may determine one of channels, operated by the first communication module 210 and the second communication module 220, as a PCC according to the result compared in operation 410. The control module 230 may determine a channel, operated by a communication module which consumes some current, as a PCC. Therefore, the control module 230 may improve use efficiency of a battery of the electronic device 101 and may increase a waiting time or an available time of the electronic device 101. If an amount of current consumed according to operation of a channel currently set to a PCC is greater than an amount of current consumed if another channel is set to the PCC, the control module 230 may change the PCC to enhance power efficiency. For example, in a state where the first channel (e.g., a band B7) operated by the first communication module 210 is set to a PCC, if an amount of current consumed in the second channel (e.g., a band B5) operated by the second communication module 220 is less than an amount of current consumed in the first channel (e.g., the band B7) operated by the first communication module 210, the control module 230 may change the PCC to the second channel to enhance power efficiency.

According to various embodiments of the present disclosure, the control module 230 may change a PCC according to settings of a user. For example, if the user additionally sets PCC change conditions (e.g., a PCC change time, a current consumption difference for changing a PCC, communication performance comparison for changing a PCC, and the like), the control module 230 may determine whether to change a PCC by reflecting a condition set by the user as well as current consumption.

According to various embodiments of the present disclosure, the control module 230 may determine whether to change a PCC by reflecting a change degree of communication performance of the first communication module 210 or the second communication module 220 according to a change of a PCC. For example, if a transfer rate of a communication module, which consumes some current, is less than or equal to a predetermined rate, the control module 230 may maintain a current PCC.

According to various embodiments of the present disclosure, if a PCC is changed, the control module 230 may provide information about the change to an external device (e.g., a base station 104 of FIG. 1).

FIG. 5 is a drawing illustrating a current consumption table according to a change of a transmit power according to various embodiments of the present disclosure. The current consumption table of FIG. 5 is an example. The scope and spirit of the present disclosure may not be limited thereto.

Referring to FIG. 5, an electronic device 101 of FIG. 1 may store a table 501 which stores information about a change of current consumed by each communication module (e.g., a first communication module 210 or a second communication module 220) according to a change of a transmit power.

If the communication module transmits data through a corresponding channel, a transmit power 510 may be a power value provided to the communication module through a control module 230 of FIG. 2. In various embodiments of the present disclosure, the transmit power 510 may be changed in connection with receive sensitivity (e.g., an RSSI) of a corresponding channel. For example, if an RSSI of a channel is −110 dBm, the transmit power 510 may be determined as 23 dBm. If an RSSI of a channel is changed to −85 dBm, the transmit power 50 may be changed as 0 dBm. If communication quality of a channel is low, the control module 230 may increase a transmit power to improve the communication quality. Relation between the transmit power 510 and receive sensitivity may be changed according to a characteristic of a channel or a characteristic of the electronic device 101.

Current consumption 520 may be an amount of current consumed per unit time by each communication module (e.g., the first communication module 210 or the second communication module 220). When current consumption is more increased, power consumed by a battery of the electronic device becomes more increased and a waiting time or an available time of the electronic device 101 becomes more decreased.

The control module 230 may select a communication module which may reduce current 520 consumed according to transmission of data and may communicate data with an external device through the selected communication module. The current consumption 520 may be changed according to configuration schemes (e.g., the number of communication modules, positions of the communication modules, connection relation between the communication modules, and the like) of the electronic device 101 or communication environments (e.g., a center frequency, a bandwidth, and the like). According to various embodiments of the present disclosure, the more the current consumption 520 is increased, the more a transmit power may be increased. The current consumption 520 may be changed according to the first communication module 210 or the second communication module 220 in the same transmit power.

According to various embodiments of the present disclosure, the control module 230 may determine a PCC according to the current consumption table 501. For example, if a transmit power corresponding to receive sensitivity (e.g., an RSSI) of the first communication module 210 is determined as 10 dBm and if a transmit power corresponding to receive sensitivity (e.g., an RSSI) of the second communication module 220 is determined as 15 dBm, an amount of current consumed by the first communication 210 may be determined as 259 mA and an amount of current consumed by the second communication module 220 may be determined as 307 mA. In this case, the control module 230 may determine a first channel, operated by the first communication module 210 which consumes some current, as a PCC to enhance power efficiency.

According to various embodiments of the present disclosure, the number of the current consumption table 501 stored in a memory 130 of FIG. 1 may be changed according to the number of frequency bands operated by the first communication module 210 or the second communication module 220. For example, if the first communication module 210 operates three bands (e.g., B1, B3, and B7) and if the second communication module 220 operates 3 other bands (e.g., B5, B8, and B12), the memory 130 may store 9 current consumption tables which may be combined. The memory 130 may store the 9 current consumption tables if each of the first communication module 210 and the second communication module 220 operates the band (B1, B5), the band (B1, B8), the band (B1, B12), the band (B3, B5), the band (B3, B8), the band (B3, B12), the band (B7, B5), the band (B7, B8), or the band (B7, B12). The control module 230 may determine a PCC according to a table matched a frequency band operated by the first communication module 210 or the second communication module 220 among a plurality of current consumption tables.

Figure 6:
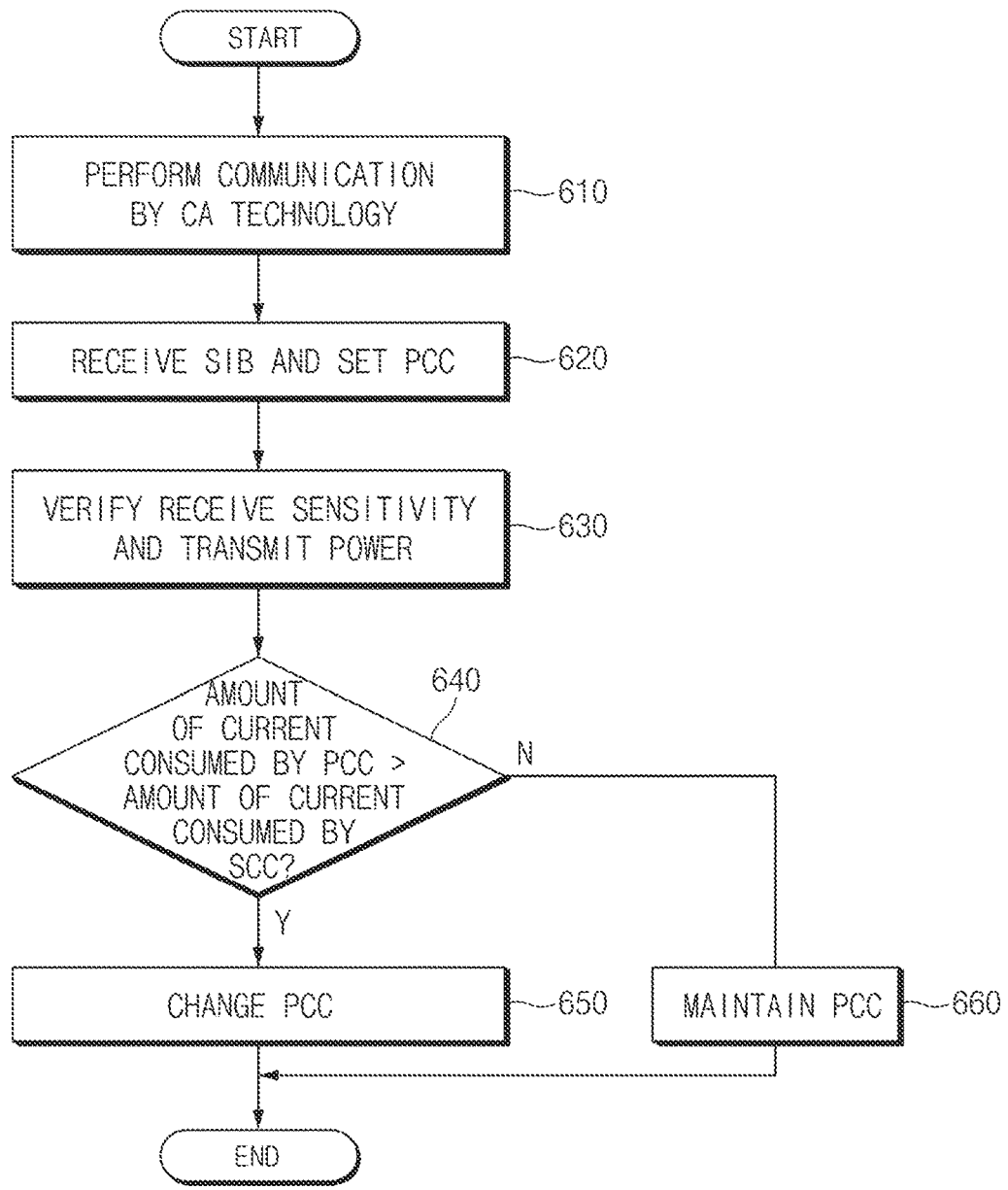
FIG. 6 is a flowchart illustrating a process of determining a primary component carrier (PCC) using a current consumption table according to various embodiments of the present disclosure.

FIG. 6 is a flowchart illustrating a process of determining a PCC using a current consumption table according to various embodiments of the present disclosure.

Referring to FIG. 6, in operation 610, a communication interface 160 of an electronic device 101 of FIG. 1 may perform communication by a CA technology. The CA technology may be a technology of combining a plurality of frequency bands and using the combined frequency band as one frequency band. The CA technology may improve a data communicating speed by efficiently using limited frequency resources.

In operation 620, a control module 230 of FIG. 2 may set a PCC through information included in an SIB received from a base station 104 of FIG. 1. Hereinafter, a description will be given of an example in which a corresponding first channel is assigned to a PCC in a first communication module 210 of FIG. 2.

In operation 630, the control module 230 may verify receive sensitivity (e.g., an RSSI) and a transmit power of each communication channel. The transmit power may be changed in response to the receive sensitivity (e.g., the RSSI). If an index about the receive sensitivity is high, the transmit power may be decreased. If the index about the receive sensitivity is low, the transmit power may be increased.

In operation 640, the control module 230 may compare an amount of current consumed by a current PCC with an amount of current consumed by a current SCC according to the receive sensitivity and the transmit power which are verified in operation 630. For example, in a table of FIG. 5, if a transmit power corresponding to receive sensitivity (e.g., an RSSI) of a first channel is determined as 10 dBm and if a transmit power corresponding to receive sensitivity (e.g., an RSSI) of a second channel is determined as 15 dBm, an amount of current consumed by the first communication module 210 may be determined as 259 mA and an amount of current consumed by a second communication module 220 may be determined as 307 mA.

In operation 650, if the amount of the current consumed by the current PCC is greater than the amount of the current consumed by the current SCC, the control module 230 may change the PCC.

In operation 660, if the amount of the current consumed by the current PCC is less than or equal to the amount of the current consumed by the current SCC, the control module 230 may maintain the current PCC. As described in the above-mentioned example, since the amount 259 mA of the current consumed by the first communication module 210 is less than the amount 307 mA of the current consumed by the second communication module 220, the control module 230 may maintain the current PCC. Since the current PCC has high power efficiency in advance, the control module 230 may maintain a current PCC/SCC state until a next comparison period.

Figure 7:
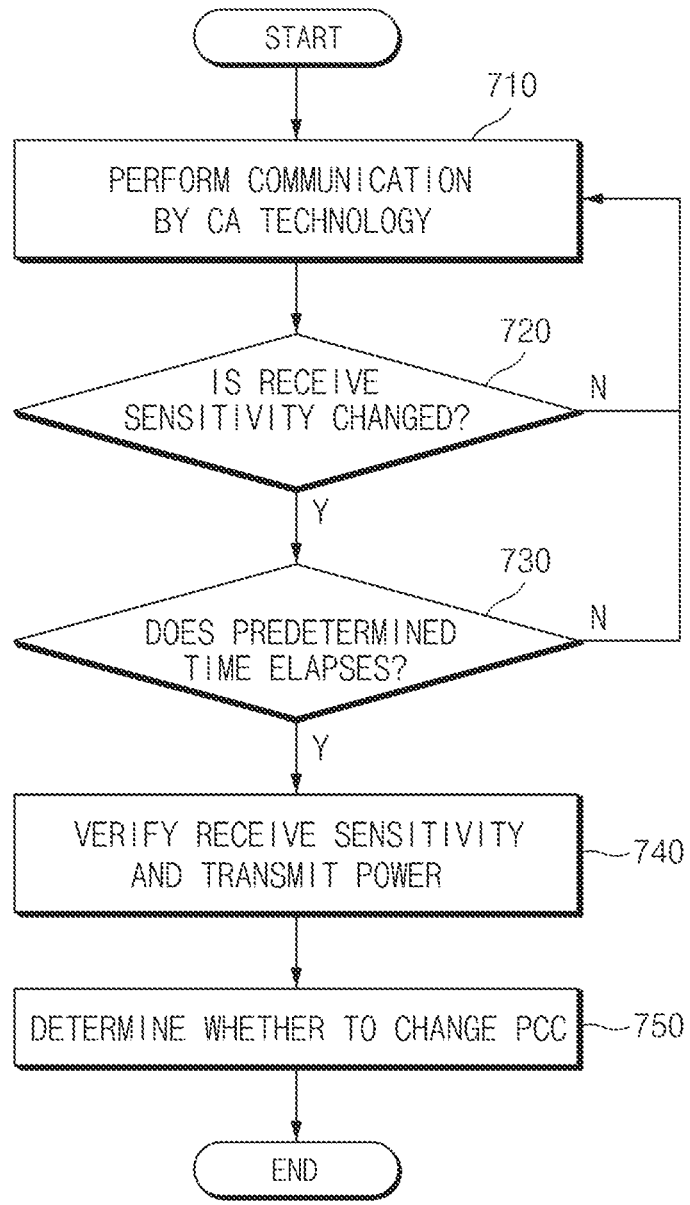
FIG. 7 is a flowchart illustrating a time point when amounts of current consumed by first and second communication modules are compared according to various embodiments of the present disclosure.

FIG. 7 is a flowchart illustrating a time point when amounts of current consumed by first and second communication modules are compared according to various embodiments of the present disclosure.

Referring to FIG. 7, in operation 710, a communication interface 160 of an electronic device of FIG. 1 may perform communication by a CA technology. A PCC or an SCC according to the CA technology may be initially set by an external device (e.g., a base station) or may be assigned through a control module 230 of FIG. 2.

In operation 720, the control module 230 may verify a change of receive sensitivity (e.g., an RSSI) in each of a first communication module 210 and a second communication module 220 of FIG. 2. In various embodiments of the present disclosure, the control module 230 may verify whether a level of receive sensitivity of a channel currently set to a PCC is greater than a predetermined range. If the level of the receive sensitivity is greater than the predetermined range, the control module 230 may compare an amount of current consumed by the first communication module 210 with an amount of current consumed by the second communication module 220.

According to various embodiments of the present disclosure, the control module 230 may determine a time point, if comparing amounts of current consumed by the first and second communication modules 210 and 220, relative to a change of receive sensitivity of each of a first channel and a second channel. In a state where an RSSI of the first channel is −110 dBm and if an RSSI of the second channel is −85 dBm, the RSSI of the first channel is changed to −90 dBm and the RSSI of the second channel is changed to −95 dBm. In other words, if a level of receive sensitivity is reversed, the control module 230 may perform current consumption comparison for changing a PCC. If a level of receive sensitivity is not reversed, the control module 230 may maintain a current PCC/SCC state.

According to various embodiments of the present disclosure, in operation 730, if receive sensitivity is changed, the control module 230 may verify whether a predetermined time elapses from a reference time point. The control module 230 may determine whether a PCC is changed after a predetermined time to prevent loss due to a repeated change. The reference time point may be a time relative to a previous time point when a PCC/SCC is changed or a previous time when receive sensitivity is reversed, and the like.

In operation 740, the control module 230 may verify receive sensitivity and a transmit power of each of the first communication module 210 and the second communication module 220. The control module 230 may compare an amount of current consumed by the first communication module 210 with an amount of current consumed by the second communication module 220 according to the verified transmit power.

In operation 750, the control module 230 may determine whether to change a PCC, according to the compared result.

According to various embodiments of the present disclosure, although a level of current consumption is reversed and it is necessary to change a PCC and an SCC, if a difference between the amounts of current consumed by the first and second communication modules 210 and 220 is within a predetermined current range (e.g., a range of 0 mA to 50 mA), the control module 230 may maintain a current PCC/SCC state. For example, in a state where the first channel is assigned to a PCC, if an amount of current consumed by the first communication module 210 is determined as 350 mA and if an amount of current consumed by the second communication module 220 is determined as 307 mA, since a difference between the amounts of the current consumed by the first and second communication modules 210 and 220 is within a range of 0 mA to 50 mA which is a predetermined current range, the control module 230 may maintain the first channel as the PCC. This is to reduce loss which may occur due to a repeated PCC change.

Figure 8:
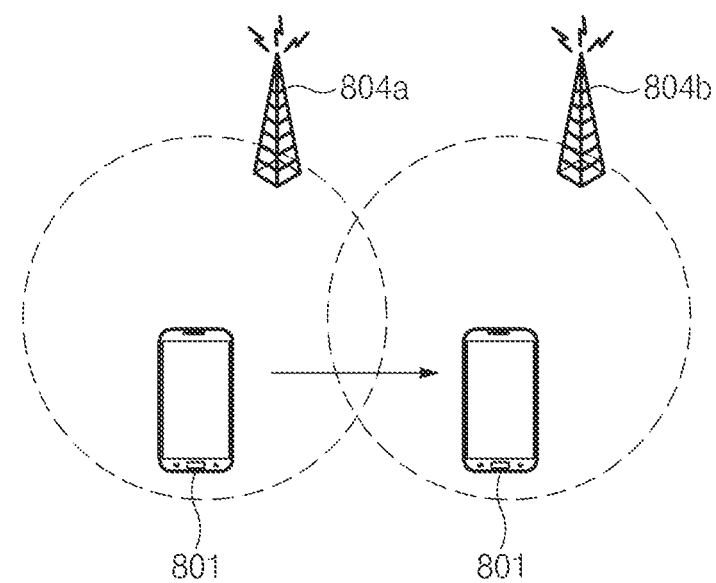
FIG. 8 is a drawing illustrating a process of changing a PCC according to a change of a base station according to various embodiments of the present disclosure.

FIG. 8 is a drawing illustrating a processing changing a PCC according to a change of a base station according to various embodiments of the present disclosure.

Referring to FIG. 8, an electronic device 801 may perform communication by a CA technology through a first base station 804a. The electronic device 801 may be assigned a PCC/SCC through the first base station 804a and may operate. A control module 230 of FIG. 2 may compare amounts of current consumed by first and second communication modules 201 and 220 and may change a PCC according to the compared result. If the PCC is changed, the electronic device 801 may inform the first base station 804a of the changed contents.

The electronic device 801 may depart from a communication radius of the first base station 804a according to its movement and may perform communication through a second base station 804b. In this case, the second base station 804b may assign a new PCC/SCC to the electronic device 801. After the new PCC/SCC is assigned to the electronic device 101, the control module 230 may compare amounts of current consumed by the first and second communication modules 210 and 220, may change a PCC according to the compared result, and may inform the changed contents to the second base station 804b. According to various embodiments of the present disclosure, the electronic device 801 may operate irrespective of assignment through the second base station 804b, or may compare amounts of current consumed by the first and second communication modules 210 and 220 immediately after a PCC is assigned by the second base station 804b and may determine to change the PCC.

According to various embodiments of the present disclosure, a communication method of an electronic device may include comparing an amount of current consumed by a first communication module which operates a first channel with an amount of current consumed by a second communication module which operates a second channel and determining at least one of the first channel or the second channel as a PCC according to the compared result.

According to various embodiments of the present disclosure, the comparing of the amount of the current consumed by the first communication module with the amount of the current consumed by the second communication module may include comparing an amount of current consumed per unit time by the first communication module according to a transmit power of the first communication module with an amount of current consumed per unit time by the second communication module according to a transmit power of the second communication module. The transmit power may be preset in connection with receive sensitivity of each of the first channel and the second channel.

According to various embodiments of the present disclosure, the determining of the at least one as the PCC may include, in a state where the first channel is set to the PCC, if the amount of the current consumed by the first communication module is greater than the amount of the current consumed by the second communication module, determining the second channel as a new PCC. The determining of the at least one as the PCC may include if a difference between the amount of the current consumed by the first communication module and the amount of the current consumed by the second communication module is within a predetermined current range, maintaining a current PCC.

According to various embodiments of the present disclosure, the comparing of the amount of the current consumed by the first communication module and the amount of the current consumed by the second communication module may include comparing the amount of the current consumed by the first communication module with the amount of the current consumed by the second communication module according to a table about an amount of current consumed per unit time by the first communication module according to a change of a transmit power of the first communication module and an amount of current consumed per unit time by the second communication module according to a change of a transmit power of the second communication module. The table may be previously stored in a format where frequency bands operated by the first communication module and the second communication may be combined.

According to various embodiments of the present disclosure, the comparing of the amount of the current consumed by the first communication module and the amount of the current consumed by the second communication module may include comparing the amount of the current consumed by the first communication module with the amount of the current consumed by the second communication module if a level of receive sensitivity of a channel set to a current PCC is greater than a predetermined range. The comparing of the amount of the current consumed by the first communication module and the amount of the current consumed by the second communication module may include determining a time point, when comparing the amount of the current consumed by the first communication module with the amount of the current consumed by the second communication module, relative to a change of receive sensitivity of each of the first channel and the second channel. The comparing of the amount of the current consumed by the first communication module and the amount of the current consumed by the second communication module may include comparing the amount of the current consumed by the first communication module with the amount of the current consumed by the second communication module if a level of the receive sensitivity and a level of the receive sensitivity of the second channel are reversed.

According to various embodiments of the present disclosure, the comparing of the amount of the current consumed by the first communication module and the amount of the current consumed by the second communication module may include if a base station which provides information about settings of the PCC is changed, comparing the amount of the current consumed by the first communication module with the amount of the current consumed by the second communication module relative to a time point when the base station is changed. The determining of the at least one channel as the PCC may include although a base station which provides information about settings of the PCC is changed, maintaining a current PCC.

According to various embodiments of the present disclosure, the first channel may communicate a signal of a first block included in a first frequency band. The second channel may communicate a signal of a second block included in a second frequency band distinguished from the first frequency band.

Figure 9:
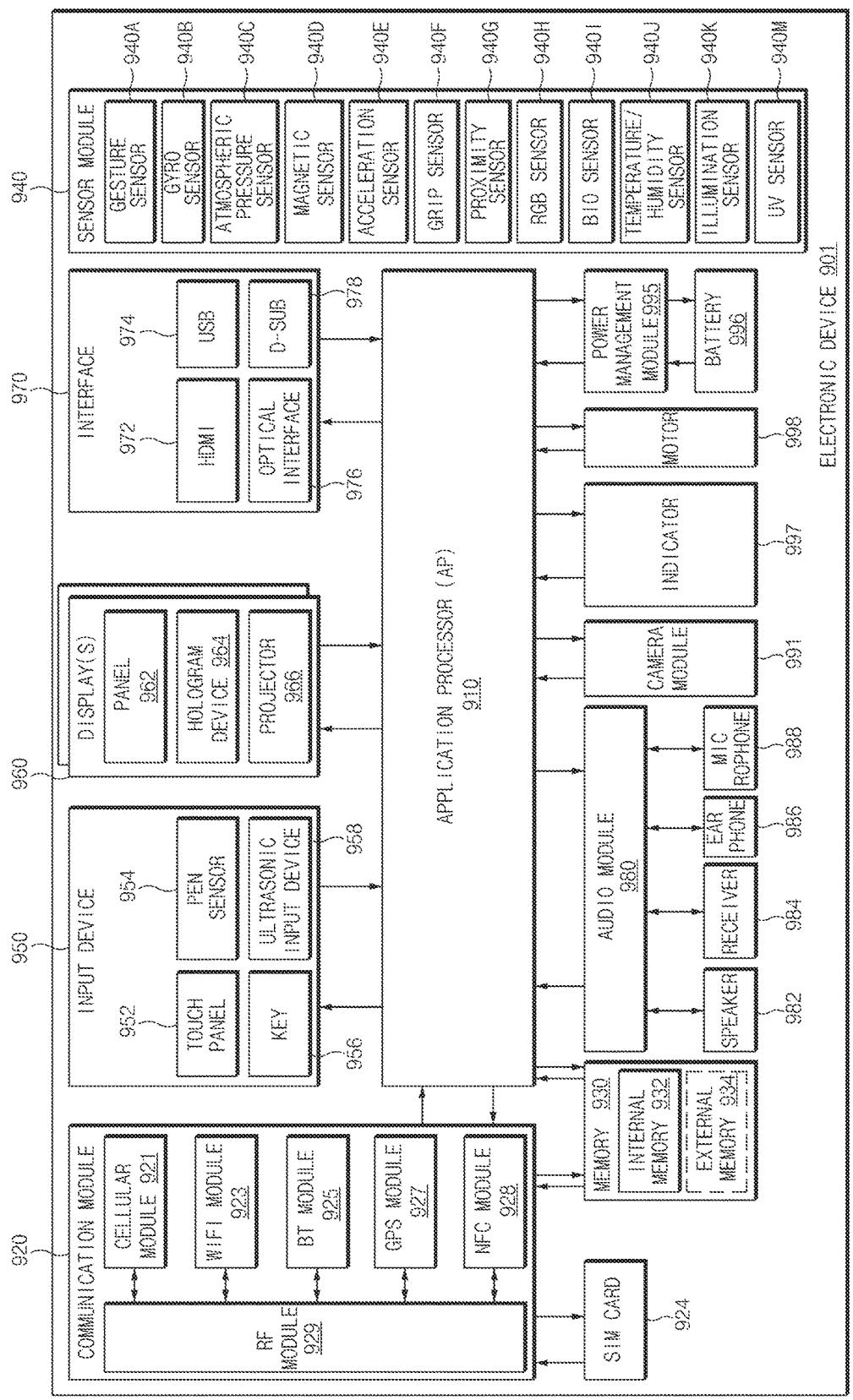
FIG. 9 is a block diagram illustrating a configuration of an electronic device according to various embodiments of the present disclosure.

FIG. 9 is a block diagram illustrating a configuration of an electronic device according to various embodiments of the present disclosure. The electronic device 901 may include all or some of an electronic device 101 shown in FIG. 1.

Referring to FIG. 9, an electronic device 901 may include one or more application processors (APs) 910, a communication module 920, a subscriber identification module (SIM) card 924, a memory 930, a sensor module, an input device 950, a display module 960, an interface 970, an audio module 980, a camera module 991, a power management module 995, a battery 996, an indicator 997, and a motor 998.

The AP 910 may drive an operating system (OS) or an application program to control a plurality of hardware or software components connected to the AP 910 and may process and compute a variety of data including multimedia data. The AP 910 may be implemented with, for example, a system on chip (SoC). According to an embodiment of the present disclosure, the AP 910 may further include a graphics processing unit (GPU) (not shown).

The communication module 920 may communicate data through communication between the electronic device 901 (e.g., the electronic device 101) and other electronic devices (e.g., a base station 104 of FIG. 1) connected thereto through a network. According to an embodiment of the present disclosure, the communication module 920 may include a cellular module 921, a Wi-Fi module 923, a BT module 925, a GPS module 927, an NFC module 928, and a radio frequency (RF) module 929.

The cellular module 921 may provide a voice call service, a video call service, a text message service, or an Internet service, and the like through a communication network (e.g., an LTE network, an LTE-A network, a CDMA network, a WCDMA network, a UMTS network, a WiBro network, or a GSM network, and the like). Also, the cellular module 921 may identify and authenticate an electronic device within a communication network using, for example, an SIM (e.g., the SIM card 924). According to an embodiment of the present disclosure, the cellular module 921 may perform at least some of functions which may be provided by the AP 910. For example, the cellular module 921 may perform at least a part of a multimedia control function.

According to an embodiment of the present disclosure, the cellular module 921 may include a communications processor (CP). Also, the cellular module 921 may be implemented with, for example, an SoC. Though components such as the cellular module 921 (e.g., a CP), the memory 930, or the power management module 995, and the like are illustrated as being components independent of the AP 910 in FIG. 9, according to an embodiment of the present disclosure, the AP 910 may be implemented to include at least some (e.g., the cellular module 921) of the above-mentioned components.

According to an embodiment of the present disclosure, the AP 910 or the cellular module 921 (e.g., a CP) may load instructions or data received from non-volatile memories respectively connected thereto or from at least one of other elements into a volatile memory to process the instructions or data. Also, the AP 910 or the cellular module 921 may store data received from at least one of other elements or generated by at least one of other elements in a non-volatile memory.

The Wi-Fi module 923, the BT module 925, the GPS module 927, or the NFC module 928 may include, for example, a processor for processing data communicated through the corresponding module. In FIG. 9, an embodiment of the present disclosure is exemplified as the cellular module 921, the Wi-Fi module 923, the BT module 925, the GPS module 927, or the NFC module 928 is a separate block. However, according to an embodiment of the present disclosure, at least some (e.g., two or more components) of the cellular module 921, the Wi-Fi module 923, the BT module 925, the GPS module 927, or the NFC module 928 may be included in one integrated chip (IC) or an IC package. For example, at least some (e.g., a CP corresponding to the cellular module 921 and a Wi-Fi processor corresponding to the Wi-Fi module 923) of processors corresponding to the cellular module 921, the Wi-Fi module 923, the BT module 925, the GPS module 927, or the NFC module 928 may be implemented with one SoC.

The RF module 929 may communicate data, for example, an RF signal. Though not shown, the RF module 929 may include, for example, a transceiver, a power amplifier module (PAM), a frequency filter, or a low noise amplifier (LNA), and the like. Also, the RF module 929 may further include a component, for example, a conductor or a conducting wire, and the like for communicating an electromagnetic wave in a space in wireless communication. In FIG. 9, an embodiment of the present disclosure is exemplified as the cellular module 921, the Wi-Fi module 923, the BT module 925, the GPS module 927, and the NFC module 928 are implemented to share the one RF module 929. However, according to an embodiment of the present disclosure, at least one of the cellular module 921, the Wi-Fi module 923, the BT module 925, the GPS module 927, or the NFC module 928 may communicate an RF signal through a separate RF module.

The SIM card 924 may be a card which includes an SIM, and may be inserted into a slot formed at a specific position of the electronic device 901. The SIM card 924 may include unique identification information (e.g., an IC card identifier (ICCID)) or subscriber information (e.g., an international mobile subscriber identity (IMSI)).

The memory 930 may include an internal memory 932 or an external memory 934. The internal memory 932 may include at least one of, for example, a volatile memory (e.g., a dynamic random access memory (DRAM), a static RAM (SRAM), a synchronous DRAM (SDRAM), and the like), or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory, and the like).

According to an embodiment of the present disclosure, the internal memory 932 may be a solid state drive (SSD). The external memory 934 may further include a flash drive, for example, a compact flash (CF), a secure digital (SD), a micro-SD, a mini-SD, an extreme digital (xD), or a memory stick, and the like. The external memory 934 may be functionally connected with the electronic device 901 through various interfaces. According to an embodiment of the present disclosure, the electronic device 901 may further include a storage device (or a storage medium) such as a hard disk drive.

The sensor module 940 may measure a physical quantity or may detect an operation state of the electronic device 901. The sensor module 940 may convert the measured or detected information to an electric signal. The sensor module 940 may include at least one of, for example, a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (e.g., a red, green, blue (RGB) sensor), a biosensor 940I, a temperature/humidity sensor 940J, an illumination sensor 940K, or an ultraviolet (UV) sensor 940M. Additionally or alternatively, the sensor module may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), and the like. The sensor module may further include a control circuit for controlling at least one or more sensors included therein.

The input device 950 may include a touch panel 952, a (digital) pen sensor 954, a key 956, or an ultrasonic input unit 958. The touch panel 952 may recognize a touch input using at least one of, for example, capacitive, resistive, infrared, and ultrasonic detecting methods. Also, the touch panel 952 may further include a control circuit.

The display module 960 (e.g., a display 150 of FIG. 1) may include a panel 962, a hologram device 964, or a projector 966. The panel 962 may be, for example, a liquid-crystal display (LCD) or an active-matrix organic light-emitting diode (AMOLED), and the like. The panel 962 may be implemented to be, for example, flexible, transparent, or wearable. The panel 962 and the touch panel 952 may be integrated into one module.

The interface 970 may include, for example, an HDMI 972, a USB 974, an optical interface 976, or a D-subminiature 978. The interface 970 may be included in, for example, a communication interface 160 shown in FIG. 1. Additionally or alternatively, the interface 970 may include, for example, a mobile high definition link (MHL) interface, an SD card/multimedia card (MMC) interface, or an infrared data association (IrDA) standard interface.

The audio module 980 may convert a sound and an electric signal in dual directions. At least some of components of the audio module 980 may be included in, for example, an input and output interface 140 shown in FIG. 1. The audio module 980 may process sound information input or output through, for example, a speaker 982, a receiver 984, an earphone 986, or a microphone 988, and the like.

The camera module 991 may be a device which captures a still picture and a moving picture. According to an embodiment of the present disclosure, the camera module 991 may include one or more image sensors (e.g., a front sensor or a rear sensor), a lens (not shown), an image signal processor (ISP) (not shown), or a flash (not shown) (e.g., an LED or a xenon lamp).

The power management module 995 may manage power of the electronic device 901. Though not shown, the power management module 995 may include, for example, a power management IC (PMIC), a charger IC, or a battery or fuel gauge.

The PMIC may be embedded in, for example, an IC or an SoC semiconductor. A charging method may be classified as a wired charging method or a wireless charging method. The charger IC may charge a battery and may prevent an overvoltage or an overcurrent from being input from a charger. According to an embodiment of the present disclosure, the charger IC may include a charger IC for at least one of the wired charging method and the wireless charging method. The wireless charging method may be, for example, a magnetic resonance method, a magnetic induction method, or an electromagnetic method. An additional circuit for wireless charging, for example, a coil loop, a resonance circuit, or a rectifier, and the like may be further provided.

The battery gauge may measure, for example, the remaining capacity of the battery 996 and voltage, current, or temperature thereof while the battery 996 is charged. The battery 996 may store or generate electricity and may supply power to the electronic device 901 using the stored or generated electricity. The battery 996 may include, for example, a rechargeable battery or a solar battery.

The indicator 997 may display a specific state of the electronic device 901 or a part (e.g., the AP 910) thereof, for example, a booting state, a message state, or a charging state, and the like. The motor 998 may convert an electric signal to mechanical vibration. Though not shown, the electronic device 901 may include a processing unit (e.g., a GPU) for supporting a mobile TV. The processing unit for supporting the mobile TV may process media data according to standards, such as a digital multimedia broadcasting (DMB) standard, a digital video broadcasting (DVB) standard, or a media flow standard, and the like.

Each of the above-mentioned elements of the electronic device described herein may be configured with one or more components, and names of the corresponding elements may be changed according to the type of the electronic device. According to various embodiments of the present disclosure, the electronic device may include at least one of the elements described herein, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific IC (ASIC) chip, field-programmable gate arrays (FPGAs), or a programmable-logic device, which is well known or will be developed in the future, for performing certain operations.

According to various embodiments of the present disclosure, at least a part of a device (e.g., modules or the functions) or a method (e.g., operations) may be implemented with, for example, instructions stored in a non-transitory computer-readable storage media which have a program module. If the instructions are executed by a processor (e.g., the AP 910), one or more processors may perform functions corresponding to the instructions. The non-transitory computer-readable storage media may be, for example, the memory 930. At least a part of the programming module may be implemented (e.g., executed) by, for example, the AP 910. At least a part of the programming module may include, for example, a module, a program, a routine, sets of instructions, or a process, and the like, for performing one or more functions.

The non-transitory computer-readable storage media may include magnetic media such as a hard disc, a floppy disk, and a magnetic tape; optical media such as a compact disc ROM (CD-ROM) and a DVD; magneto-optical media such as a floptical disk; and a hardware device specially configured to store and execute program instructions (e.g., program modules), such as a ROM, a RAM and a flash memory. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

According to various embodiments of the present disclosure, a non-transitory computer-readable storage medium having embodied thereon instructions, for controlling an operation of an electronic device and allowing the electronic device to perform a communication method, the method comprising comparing an amount of current consumed by a first communication module which operates a first channel with an amount of current consumed by a second communication module which operates a second channel and determining at least one of the first channel and the second channel as a PCC according to the compared result.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments of the present disclosure, the electronic device may enhance its power efficiency by determining a characteristic or a priority of a channel according to the amount of current consumed by the electronic device in the CA technology.

According to various embodiments of the present disclosure, the electronic device may increase a waiting time or an available time by determining a characteristic or a priority of a channel according to various conditions of the electronic device itself in the CA technology.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of an electronic device using carrier aggregation, the method comprising:
    determining, using at least one processor, a primary component carrier (PCC) from one of a first channel or a second channel according to a control signal received from a base station,
    comparing, using the at least one processor of the electronic device, an amount of current consumed by a first transceiver which operates the first channel with an amount of current consumed by a second transceiver which operates the second channel after a predetermined time; and
    determining, using the at least one processor, the primary component carrier (PCC) from at least one of the first channel or the second channel according to the compared result,
    wherein the comparing of the amount of the current consumed by the first transceiver and the amount of the current consumed by the second transceiver comprises:
        comparing an amount of current consumed per unit time by the first transceiver with an amount of current consumed per unit time by the second transceiver, using a table including the amount of current consumed per unit time by the first transceiver based on a change of a transmit power of the first transceiver and the amount of current consumed per unit time by the second transceiver based on a change of a transmit power of the second transceiver, and
    wherein the determining the PCC comprises:
        determining, in a state where the first channel is set to the PCC, if the amount of the current consumed by the first transceiver is greater than the amount of the current consumed by the second transceiver, the second channel as a new PCC.

2. The method of claim 1, wherein the transmit power of the first transceiver is calculated based on information received about a received signal strength indication (RSSI) of a first receiver and the transmit power of the second transceiver is calculated based on information received about a RSSI of the second transceiver.

3. The method of claim 1, wherein the transmit power is preset based on receive sensitivity of each of the first channel and the second channel.

4. The method of claim 1, wherein the determining of the at least one as the PCC comprises:

if a difference between the amount of the current consumed by the first transceiver and the amount of the current consumed by the second transceiver is within a current range, maintaining a current PCC.

5. The method of claim 1, wherein the table is previously stored in a format in which frequency bands operated by the first transceiver and the second transceiver are combined.

6. The method of claim 1, wherein the comparing of the amount of the current consumed by the first transceiver and the amount of the current consumed by the second transceiver comprises:
comparing, if a level of receive sensitivity of a channel set to a current PCC is greater than a range, the amount of the current consumed by the first transceiver with the amount of the current consumed by the second transceiver.

7. The method of claim 1, wherein the comparing of the amount of the current consumed by the first transceiver and the amount of the current consumed by the second transceiver comprises:
determining a time point, when comparing the amount of the current consumed by the first transceiver with the amount of the current consumed by the second transceiver, relative to a change of receive sensitivity of each of the first channel and the second channel.

8. The method of claim 1, wherein the comparing of the amount of the current consumed by the first transceiver and the amount of the current consumed by the second transceiver comprises:
comparing if a level of receive sensitivity of the first channel and a level of receive sensitivity of the second channel are reversed, the amount of the current consumed by the first transceiver with the amount of the current consumed by the second transceiver.

9. The method of claim 1, wherein the comparing of the amount of the current consumed by the first transceiver and the amount of the current consumed by the second transceiver comprises:
comparing if a base station which provides information about settings of the PCC is changed, the amount of the current consumed by the first transceiver with the amount of the current consumed by the second transceiver relative to a time point when the base station is changed.

10. The method of claim 1, wherein the determining of the at least one as the PCC comprises:
if a base station which provides information about settings of the PCC is changed, maintaining settings of a current PCC.

11. The method of claim 1,
wherein the first channel communicates a signal of a first block included in a first frequency band, and
wherein the second channel communicates a signal of a second block included in a second frequency band distinguished from the first frequency band.

12. An electronic device for performing communication through a channel using carrier aggregation, the electronic device comprising:
a first transceiver configured to operate a first channel;
a second transceiver configured to operate a second channel; and
at least one computer processor configured to:
determine a primary component carrier (PCC) from one of the first channel or the second channel according to a control signal received from a base station, and
compare an amount of current consumed by the first transceiver with an amount of current consumed by the second transceiver after a predetermined time,
wherein the at least one computer processor is configured to determine the primary component carrier (PCC) from at least one of the first channel or the second channel as according to the compared result,
wherein the at least one computer processor is further configured to compare an amount of current consumed per unit time by the first transceiver with an amount of current consumed per unit by the second transceiver, using a table including the amount of current consumed per unit time by the first transceiver based on a change of a transmit power of the first transceiver and the amount of current consumed per unit time by the second transceiver based on a change of a transmit power of the second transceiver, and
wherein in a state where the first channel is set to the PCC, if the amount of the current consumed by the first transceiver is greater than the amount of the current consumed by the second transceiver, the at least one computer processor is further configured to determine the second channel as a new PCC.

13. The electronic device of claim 12, the transmit power of the first transceiver is calculated based on information received about a received signal strength indication (RSSI) of a first receiver and the transmit power of the second transceiver is calculated based on information received about a RSSI of the second transceiver.

14. The electronic device of claim 13, wherein the transmit power is preset in connection with receive sensitivity of each of the first channel and the second channel.

15. The electronic device of claim 12, wherein if a difference between the amount of the current consumed by the first transceiver and the amount of the current consumed by the second transceiver is within a current range, the at least one computer processor is further configured to maintain a current PCC.

16. A non-transitory computer-readable storage medium having embodied thereon instructions for controlling an operation of an electronic device and allowing the electronic device to perform a communication method using carrier aggregation, the method comprising:
determining a primary component carrier (PCC) from one of a first channel or a second channel according to a control signal received from a base station, comparing an amount of current consumed by a first transceiver which operates the first channel with an amount of current consumed by a second transceiver which operates the second channel after a predetermined time; and
determining the primary component carrier (PCC) from at least one of the first channel or the second channel as according to the compared result,
wherein the comparing of the amount of the current consumed by the first transceiver and the amount of the current consumed by the second transceiver comprises:
comparing an amount of current consumed per unit time by the first transceiver with an amount of current consumed per unit time by the second transceiver, using a table including the amount of current consumed per unit time by the first transceiver based on a change of a transmit power of the first transceiver and the amount of current consumed per unit time by the second transceiver based on a change of a transmit power of the second transceiver, and
wherein the determining the PCC comprises:

determining, in a state where the first channel is set to the PCC, if the amount of the current consumed by the first transceiver is greater than the amount of the current consumed by the second transceiver, the second channel as a new PCC.

\* \* \* \* \*